(12) United States Patent
Koerber et al.

(10) Patent No.: US 10,877,146 B2
(45) Date of Patent: Dec. 29, 2020

(54) RADAR SENSOR, RADAR SENSOR SYSTEM, AND METHOD FOR DETERMINING THE POSITION OF AN OBJECT USING HORIZONTAL AND VERTICAL DIGITAL BEAM FORMATION FOR MEASURING POINT-REFLECTIVE AND SURFACE-REFLECTIVE OBJECTS

(71) Applicant: ASTYX GmbH, Ottobrunn (DE)

(72) Inventors: Richard Koerber, Hallerndorf (DE); Markus Hommen, Munich (DE); Benedikt Schulte, Munich (DE); Frank Bauer, Ottobrunn (DE)

(73) Assignee: ASTYX GmbH

( * ) Notice: Subject to any disclaimer, the term of this patent is extended or adjusted under 35 U.S.C. 154(b) by 102 days.

(21) Appl. No.: 15/532,400

(22) PCT Filed: Dec. 7, 2015

(86) PCT No.: PCT/EP2015/078879
§ 371 (c)(1),
(2) Date: Jun. 1, 2017

(87) PCT Pub. No.: WO2016/087679
PCT Pub. Date: Jun. 9, 2016

(65) Prior Publication Data
US 2017/0329002 A1     Nov. 16, 2017

(30) Foreign Application Priority Data
Dec. 5, 2014 (DE) .................. 10 2014 118 031

(51) Int. Cl.
*G01S 13/931* (2020.01)
*H01Q 1/32* (2006.01)
(Continued)

(52) U.S. Cl.
CPC .............. *G01S 13/931* (2013.01); *G01S 7/03* (2013.01); *G01S 7/41* (2013.01); *G01S 13/42* (2013.01);
(Continued)

(58) Field of Classification Search
None
See application file for complete search history.

(56) References Cited

U.S. PATENT DOCUMENTS 6,205,710 B1   3/2001  Busse
6,246,365 B1   6/2001  Tokoro
(Continued)

FOREIGN PATENT DOCUMENTS

DE   10 2004 059915   6/2006
DE   10 2008 038365   1/2010
(Continued)

OTHER PUBLICATIONS

Radar Basics—Fan-Beam Antenna (Year: 1998).*
(Continued)

*Primary Examiner* — Whitney Moore
(74) *Attorney, Agent, or Firm* — Fish & Richardson P.C.

(57) ABSTRACT

A radar sensor for a vehicle includes a control unit and an antenna array. The radar sensor is configured to perform a three-dimensional scan to determine a vertical and a horizontal position of an object in order to assist with distinguishing the geometrical nature of the object.

15 Claims, 13 Drawing Sheets

(51) Int. Cl.
  *H01Q 21/06* (2006.01)
  *G01S 7/41* (2006.01)
  *G01S 13/42* (2006.01)
  *G01S 13/87* (2006.01)
  *G01S 7/03* (2006.01)
  *E05F 15/40* (2015.01)
  *E05F 15/43* (2015.01)

(52) U.S. Cl.
  CPC ........... *G01S 13/87* (2013.01); *H01Q 1/3233* (2013.01); *H01Q 21/061* (2013.01); *G01S 2013/9314* (2013.01); *G01S 2013/93274* (2020.01)

(56) References Cited

U.S. PATENT DOCUMENTS

| | | | |
|---|---|---|---|
| 2003/0151541 | A1 | 8/2003 | Oswald et al. |
| 2008/0258964 | A1 | 10/2008 | Shoeberl et al. |
| 2010/0109938 | A1* | 5/2010 | Oswald ............... G01S 7/2926 342/90 |
| 2011/0074620 | A1 | 3/2011 | Wintermantel |
| 2011/0080313 | A1* | 4/2011 | Wintermantel ......... G01S 7/032 342/70 |
| 2011/0234449 | A1 | 9/2011 | Haberland |
| 2014/0070994 | A1* | 3/2014 | Schmalenberg ........ G01S 7/032 342/368 |
| 2016/0025839 | A1 | 1/2016 | Trummer |

FOREIGN PATENT DOCUMENTS

| | | |
|---|---|---|
| DE | 102008052246 | 4/2010 |
| DE | 10 2010 012626 | 9/2011 |
| DE | 10 2011 079003 | 1/2013 |
| DE | 10 2011 113015 | 3/2013 |
| DE | 102011113018 | 3/2013 |
| DE | 10 2013 102424 | 9/2014 |
| EP | 0 947 852 | 10/1999 |
| EP | 1 002 920 | 5/2000 |
| JP | 2001324564 | 11/2001 |
| JP | 2010025928 | 2/2010 |
| JP | 2010158917 | 7/2010 |
| JP | 2011226794 | 11/2011 |
| JP | 2013007756 | 1/2013 |
| JP | 2014055957 | 3/2014 |
| JP | 2014529076 | 10/2014 |
| JP | 2014530343 | 11/2014 |
| JP | 2016516983 | 6/2016 |
| WO | WO 2013034282 | 3/2013 |

OTHER PUBLICATIONS

International Search Report for Corresponding International Patent Application PCT/EP2015/078879, dated Mar. 16, 2016 (with English translation) 8 pages.
EP Office Action issued in European Application No. 15820 448.7-1206, dated Jan. 4, 2019, 6 pages.
JP Office Action in Japanese Appln No. 2017-527753, dated Jul. 2, 2019, 9 pages (with English translation).
CN Office Action in Chinese Appln. No. 201580066037.7, dated May 27, 2020, 13 pages (with English Translation).
CN Office Action in Chinese Appln. No. 201580066037.7, dated Nov. 4, 2019, 19 pages (with English Translation).
DE Search Report in German Appln. No. 102014118031.3, dated Jan. 28, 2015, 13 pages (with English Translation).
EP Office Action issued in European Application No. 15820448.7, dated Mar. 30, 2020, 5 pages (with English Translation).
JP Office Action in Japanese Appln No. 2017-527753, dated Feb. 12, 2020, 4 pages (with English translation).
Mayer et al., "Imaging radar sensor with an array antenna switched on the transmit side," Dissertation, Gottingen, Germany, Dec. 31, 2008, ISBN 978-3-86727-565-1 (with English Abstract).
Ninomiya, "Sensing and recognition technology around vehicles," The Institute of Systems, Control and Information Engineers, System/Control/Information, 2011, 55:.8-13, 22 pages (with English translation).
PCT International Preliminary Report on Patentability in International Appln. No. PCT/EP2015/078879, dated Jun. 15, 2017, 19 pages (with English Translation).
CN Office Action in Chinese Appln. No. 201580066037.7. dated Aug. 28, 2020, 14 pages (with English Translation).

* cited by examiner

RADAR SENSOR, RADAR SENSOR SYSTEM, AND METHOD FOR DETERMINING THE POSITION OF AN OBJECT USING HORIZONTAL AND VERTICAL DIGITAL BEAM FORMATION FOR MEASURING POINT-REFLECTIVE AND SURFACE-REFLECTIVE OBJECTS

TECHNICAL FIELD OF APPLICATION

The invention relates to a radar sensor, a radar sensor system and to a method for determining the position of an object.

Millimetre wave radar sensors, e.g. for automotive and aeronautical applications, should exhibit a compact and inexpensive construction.

If the detection is restricted to just one plane (mostly the horizontal plane), as is the case with most automotive radar sensors, this can take place inexpensively by using planar antennas and a number of receivers. The beam formation and control take place here by the principle of "digital beamforming".

However, for some applications precise vertical and horizontal position determination are required. This applies, for example, to a sensor system for monitoring the door area of motor vehicles of which the doors can open automatically. Here the sensor must detect potential obstacles so that any collision with the opening door is avoided. These obstacles can be positioned anywhere within the range of the vehicle height.

Another application is so-called parking assistance with which, for example, a distinction must be made between potentially colliding objects and low curbstones.

A distinction can essentially be made between the reflection behaviour of planar and of punctiform reflectors in that planar surfaces only exhibit significant reflection when the incident radar beam is vertical, whereas with punctiform reflectors this incident beam can also be at other angles. This fact may lead to the contour of extensive planar surfaces not being recognised, and a collision may occur, in particular, with automatically opening doors.

PRIOR ART

From the dissertation of Dr. Winfried Mayer entitled "Imaging radar sensor with group antenna connected on the transmitting side", Cuvillier Verlag, Gottingen 2008, ISBN 978-3-86727-565-1/1/a method and an apparatus are known which monitor an area by the technique of digital beam formation in which an antenna array with a number of transmitters and a number of receivers is used.

In DE 10 2008 052 246 A1 a sensor system with an adjustable elevation beam direction for determining the vertical position of objects is described. The adjustment takes place here by the mechanical movement of a reflector.

In PCT/EP2012/003702 an imaging radar sensor with synthetic enlargement of the antenna aperture and two-dimensional beam scanning is described. The two-dimensional beam scanning takes place here in the horizontal by digital beam formation from a number of reception channels, and in the vertical by comparing the amplitudes of two received signals which are generated by two transmitters which have an antenna diagram tilted towards one another in the vertical. However, in practice this method is associated with the disadvantage that the amplitude characteristics of the antenna diagrams are distorted by structures upstream of the sensor such as radomes, plastic bumpers or door sills. This means that depending on the barrier, calibration of the radar sensor is to be performed in order to detect these distortions metrologically and to compensate for them.

SUMMARY OF THE INVENTION

The object of the invention is to make available an apparatus, a method and a radar system by means of which the disadvantages described above are avoided. Furthermore, it is the object of the invention to make available a radar sensor and a radar sensor system and an apparatus and a method by means of which a vertical position of an object can be determined and with the aid of which classification distinguishing between punctiform and flat objects can be performed.

The following possible solutions are relevant to the invention, for example by means of an A. apparatus for determining the position of an object three-dimensionally, comprising at least two radar transmitting/receiving devices, each device having at least 4 receivers and one or two transmitters, with an antenna array for horizontal beam scanning and which has a fan-shaped beam in the vertical, and an antenna array for vertical beam scanning, the individual emitting elements of which have wide directional characteristics in the vertical and in the horizontal, B. an apparatus for determining the position of an object three-dimensionally, comprising a row of transmitting antennas and a row of receiving antennas, characterised in that the two rows of antennas are arranged orthogonally to one another, an evaluation unit which generates a virtual array from the sequential received signals from the individual transmitters, the antenna beam of which can be controlled electronically both in the vertical and in the horizontal, or a C. radar system for the use of an apparatus for determining a position of an object three-dimensionally in accordance with A and B, consisting of two transmitting/receiving devices that are independent of one another for horizontal and vertical beam scanning, D. a radar system for the use of an apparatus for determining a position of an object three-dimensionally in accordance with B, consisting of at least 4 transmitters and 8 receivers which are synchronised with one another and so allow two-dimensional beam scanning of an individual antenna beam, and furthermore E. a radar system wherein the individual beam elements are arranged within the transmitter and the receiver at an angle of 45 degrees and so both the transmitter and the receiver have the same polarisation;

F. a radar sensor arrangement for distinguishing between punctiform and flat reflectors, characterised in that the detection ranges of the two sensors overlap, and that the sensors are arranged lying opposite one another, preferably with a G. method for determining a position of an object that comprises the procedural steps:

transmitting and receiving signals with the aid of antennas with an antenna beam in the form of a fan in the vertical direction, combining the received signals by the method of digital beam formation to form a number of bundled antenna beams in the horizontal direction, transmitting and receiving signals with wide antenna beams in the vertical and the horizontal direction, the antennas being arranged orthogonally to the antennas with a fan-shaped beam,
combining these signals by the method of digital beam formation to form a number of bundled antenna beams in the vertical direction, displaying the horizontal and the vertical position of the object
and/or a
H. method for determining a position of an object with an apparatus according to Claim 2, comprising the procedural steps:
sequentially transmitting signals with a row of transmitters, and simultaneously receiving the beams reflected on objects with a row of receivers,
combining the received signals by the method of two-dimensional digital beam formation to form a number of bundled antenna beams in the horizontal and the vertical direction,
displaying the horizontal and the vertical position of the object.

By using a second radar sensor, among other things a corrective is provided which is arranged offset with respect to the first in the direction of travel. The sensors are linked to one another, and the information that is collected is evaluated by one of the two sensors by the master/slave principle.

Advantageous configurations are illustrated by the following figures.

Figure 1:
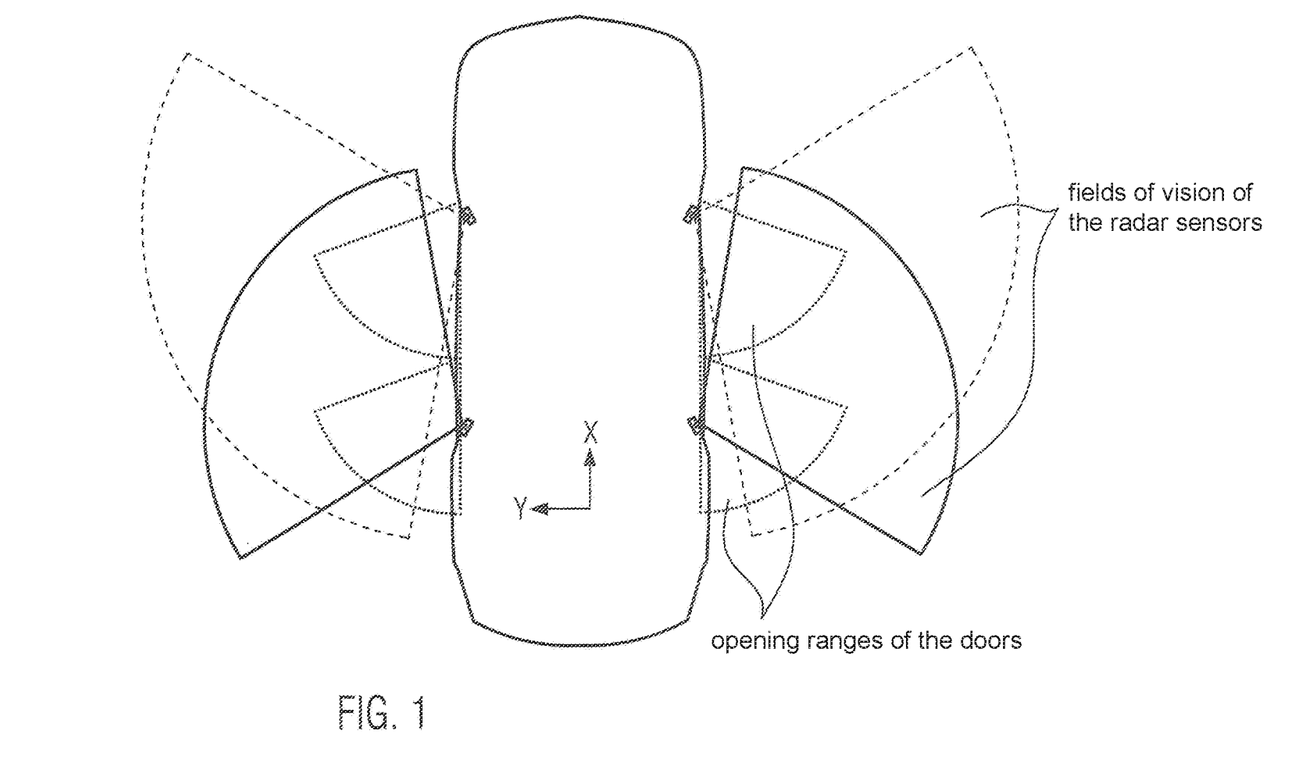
FIG. 1 shows the sensor arrangement on the vehicle with a horizontal field of vision for monitoring the opening range of the doors.

FIG. 1 shows the sensor arrangement on the vehicle with a horizontal field of vision for monitoring the opening range of the doors. The sensors are each fitted tilted by approx. 30 degrees and have a field of vision of approx. 110 degrees. At least 2 sensors are to be fitted on each side of the vehicle in order to cover the opening range of the doors optimally.

Figure 2:
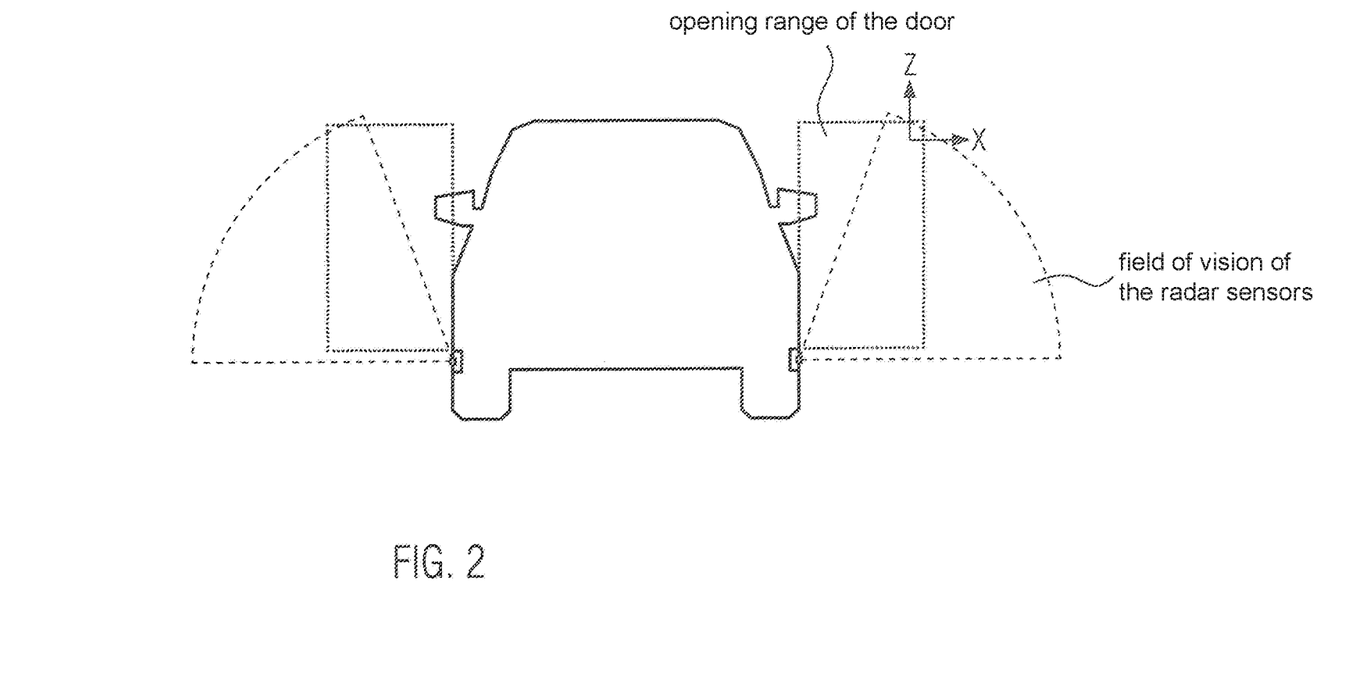
FIG. 2 shows the vertical field of vision of the sensors and the range of potential obstacles.

FIG. 2 shows the vertical field of vision of the sensors and the range of potential obstacles.

The arrangement of the sensors has been chosen so that on the one hand the opening range of the doors is covered maximally, and on the other hand so that punctiform reflectors can be distinguished from flat reflectors. Overlapping of the fields of vision of the sensors is required for this purpose.

With punctiform objects the door may open up to the object, whereas with flat obstacles, such as for example walls or vehicles parked adjacent, the door may only open to the potentially extended surface.

Figure 3:
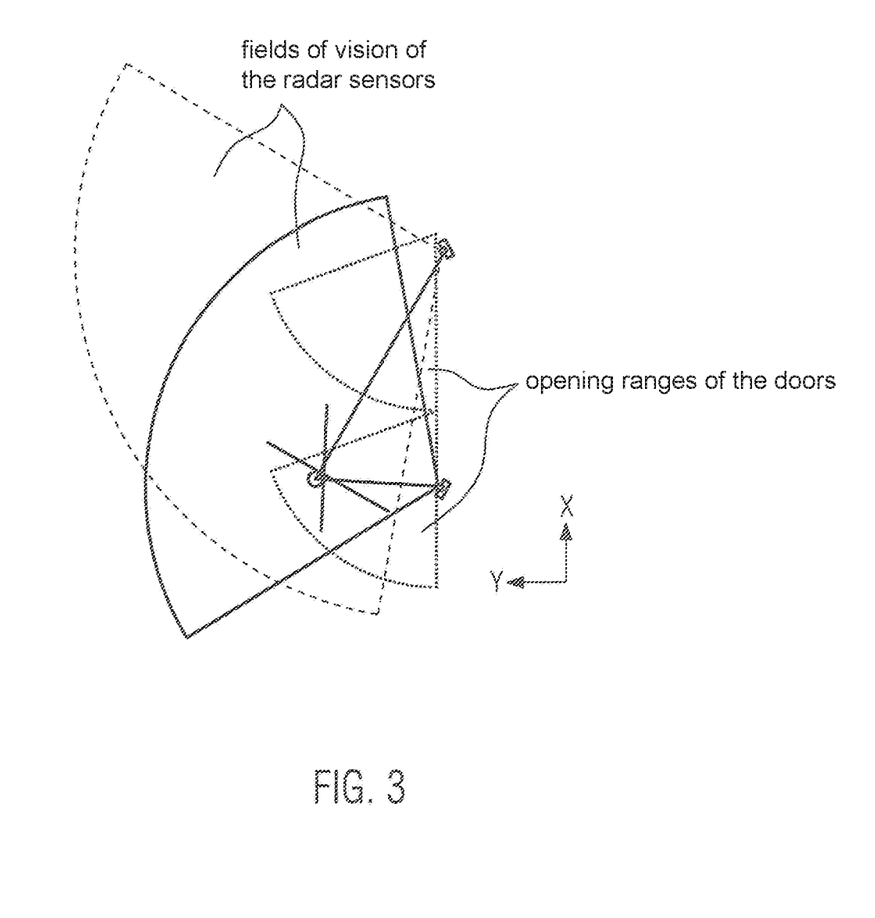
FIG. 3 shows the detection of a punctiform reflector.
Figure 4:
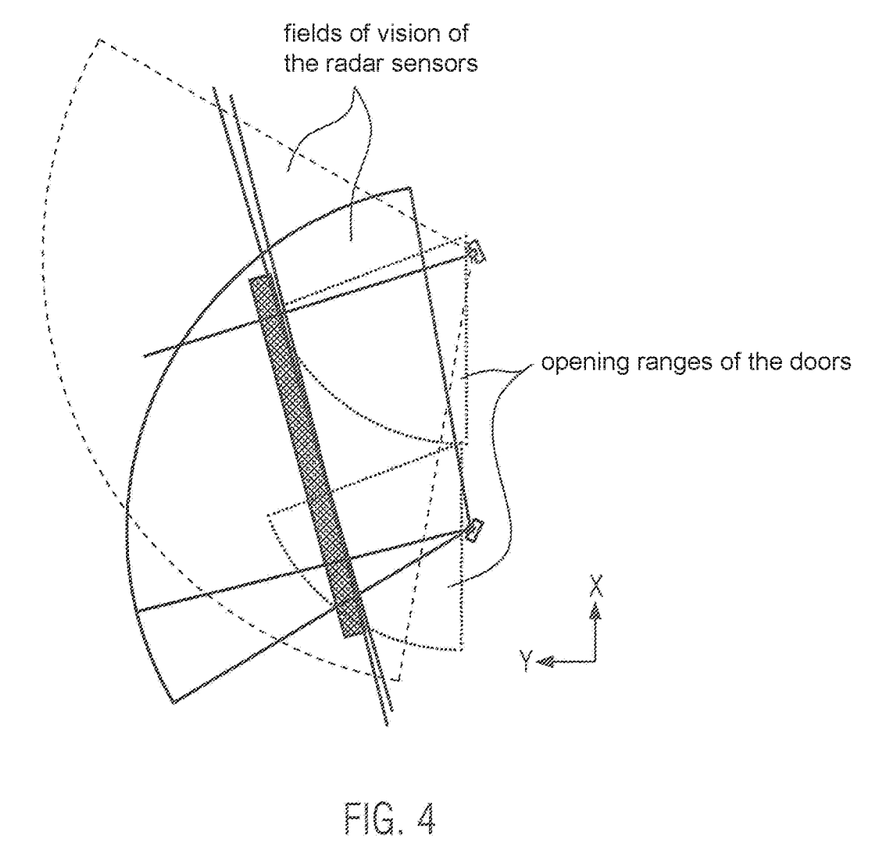
FIG. 4 shows the detection of a planar, flat object.

In FIG. 3 the detection of a punctiform reflector, and in FIG. 4 the detection of a planar, flat object is sketched.

The distance and the angle of the punctiform object is detected by both sensors. However, with flat, planar objects only reflections occur with a perpendicular angle of incidence. Neither of the sensors is capable of detecting one and the same reflection point. The radar sensors detect the radial distance and the angle in relation to the point of reflection. If one now forms the orthogonals to the beam directions of the individual sensors, the latter run approximately parallel with a surface target and cross with a point target. With the point target the doors may be opened up to its position, and with a surface target only up to the extended orthogonal. The doors are thus prevented from touching the wall when opened, even though the reflection point is further away than the collision point.

Detailed Description

Figure 5:
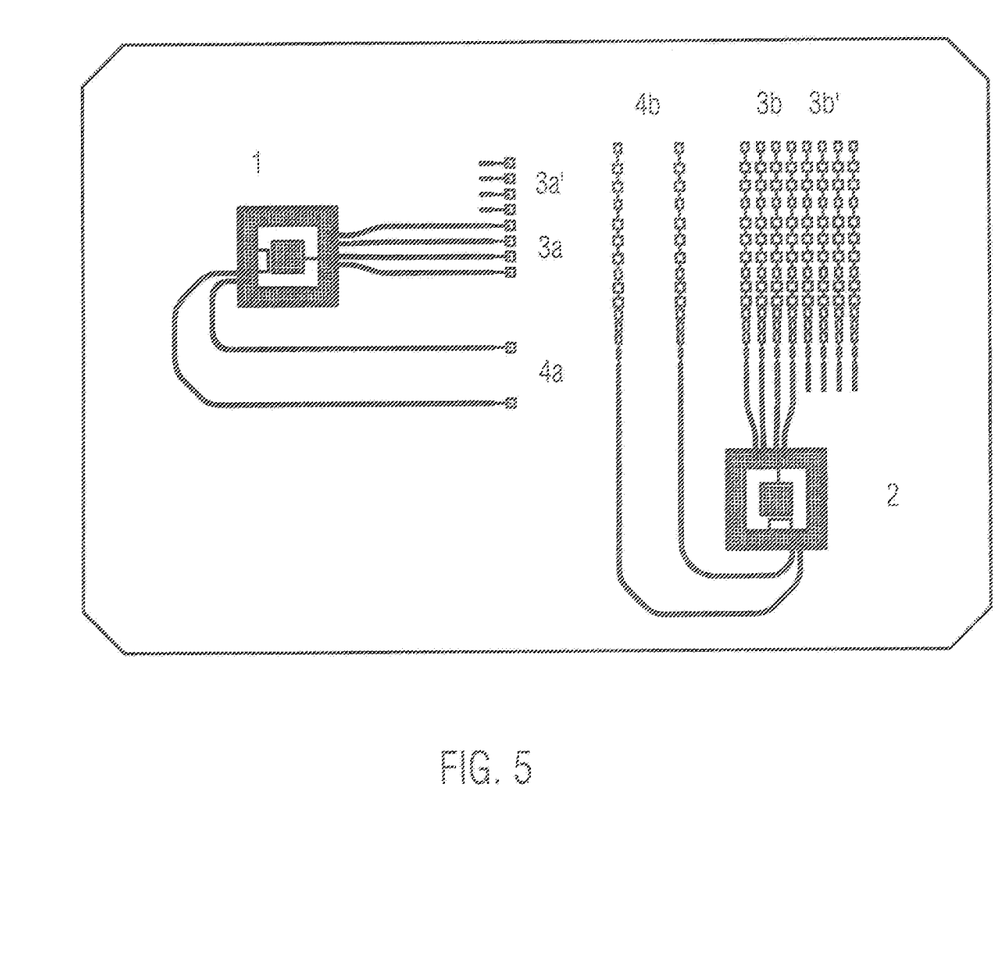
FIG. 5 shows the millimetre wave module of an individual radar sensor with an antenna arrangement.

FIG. 5 shows the millimetre wave module of an individual radar sensor with an antenna arrangement. The sensor consists of a transmitting/receiving device (1) for the vertical scan and a transmitting/receiving device (2) for the horizontal scan. Every transmitting/receiving device consists of at least 4 receivers (3a, 3b) and one or two transmitters (4a, 4b). Since the required detection rate for the door monitoring is low in comparison to the measuring rate of the sensor, the sensor system can perform the vertical detection and the horizontal detection one after the other chronologically. This reduces costs because only one signal processing unit is required. Furthermore, the transmitting/receiving units are prevented from disrupting one another.

Figure 6:
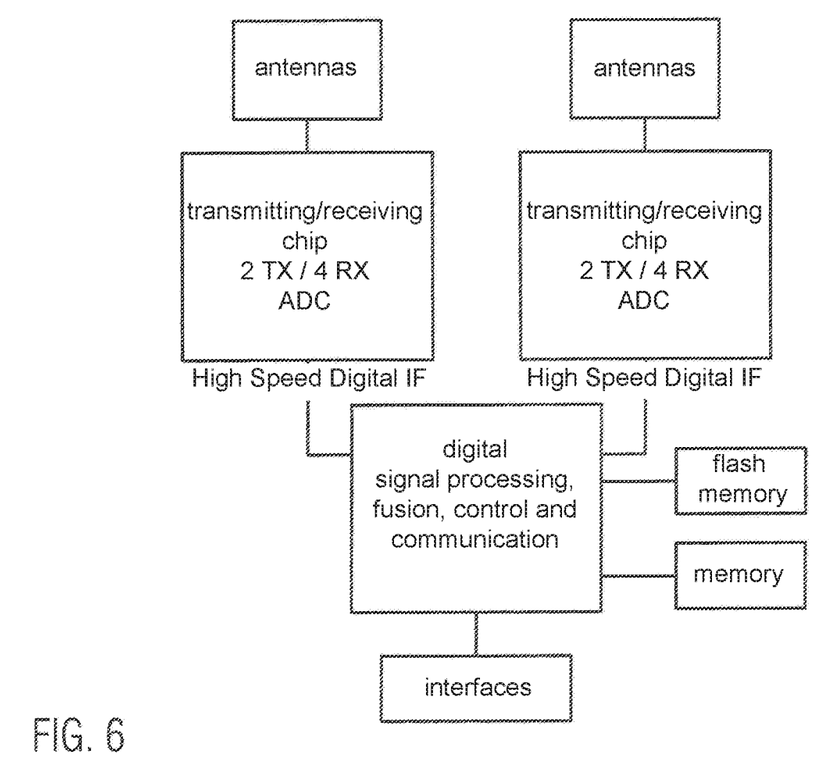
FIG. 6 shows the functional block diagram of the radar sensor.

FIG. 6 shows the functional block diagram of the radar sensor. It consists of two highly integrated radar front ends, each with two transmitters and four receivers. Analogue to digital converters are already integrated into the receivers so that the latter can be connected directly to the signal processing unit—a multicore digital signal processor. The signal processor additionally performs the task of controlling the transmitting/receiving modules and operates the communication interface with the outside world, e.g. with the control electronics of the automatic door.

Preferably with the digital beam formation described in/1/with two transmitters and a number of receivers, the vertical and the horizontal angular position of the object to be detected is now determined and the distance from the object is measured. The individual transmitters of a pair of transmitters are operated one after the other chronologically here. The bringing together of the information from the two detection processes corresponds to the detection with just one transmitter and reception with a virtual array (3a', 3b') which is twice as great as the real array. The angle measuring accuracy can thus be increased by a factor of 2. If this is not required, the detection can also be operated with just one transmitter.

Figure 7:
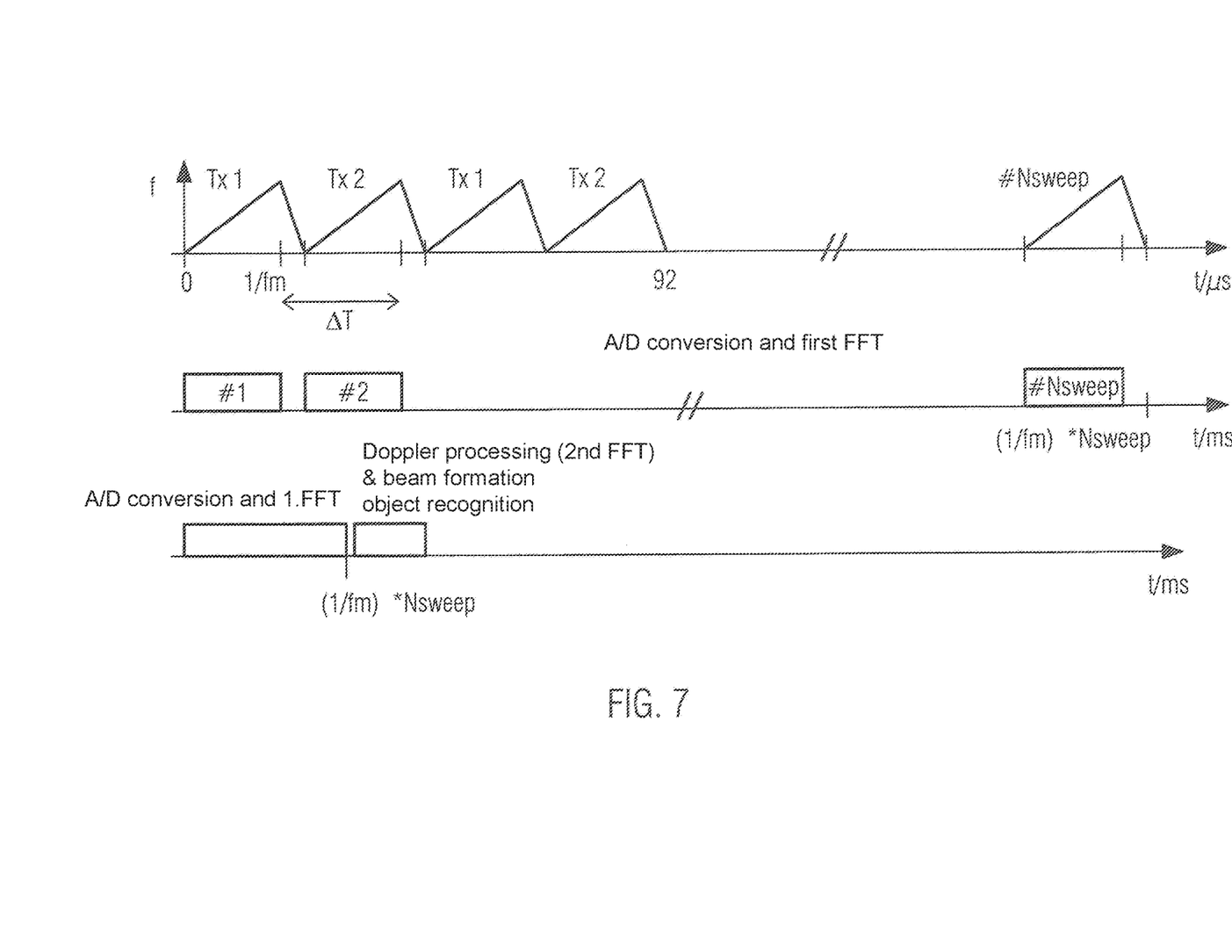
FIG. 7 shows the time diagram and the modulation form of an individual transmitting/receiving unit.

FIG. 7 shows the time diagram and the modulation form of an individual transmitting/receiving unit.

Here the frequency of the two transmitters is modulated alternately, linearly and in the form of saw teeth. This cycle is repeated n times. The distance from the object is determined from the sets of data of the individual modulation ramps with the aid of a Fast Fourier Transform (FFT). Afterwards these sets of data are arranged to form a spectrogram and a second FFT is calculated by means of the columns of the spectrogram matrix. The line position of this so-called range-Doppler matrix corresponds to the speed of the object, and the column position corresponds to the radial distance. The modulation frequency fm is greater than the maximum Doppler frequency that occurs, and so an independent and clear distance and speed measurement can be taken.

Figure 8:
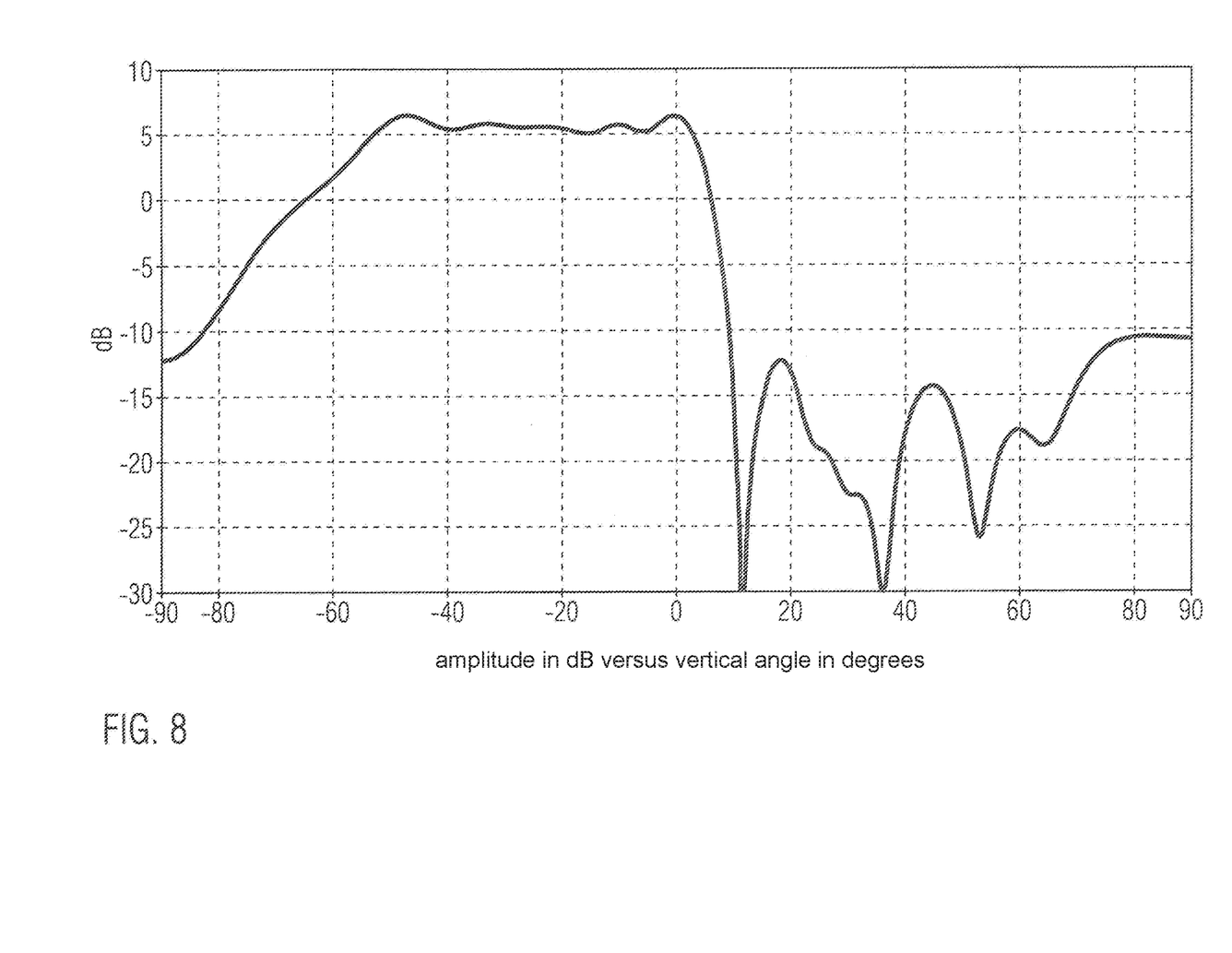
FIG. 8 shows a vertical diagram of an antenna line.

Horizontal Scan:

In order to cover the field of vision illustrated in FIGS. 1 and 2 an antenna line has been chosen which has the vertical diagram shown in FIG. 8. The arrangement and dimensioning of the individual emitter elements of the antenna line has not been optimised here to the maximum beam bundling as is otherwise normal, but is designed so that an upwardly directed fan-shaped beam is formed. This fan-shaped beam ensures that reflections of objects which are suppressed when they lie beneath the door sill and the sensor can also still detect objects with high vertical angles. The gain of this type of antenna line corresponds approximately to only that of an individual emitter. However, the distance from the objects is so small that the radar sensor is still sufficiently sensitive.

Figure 9:
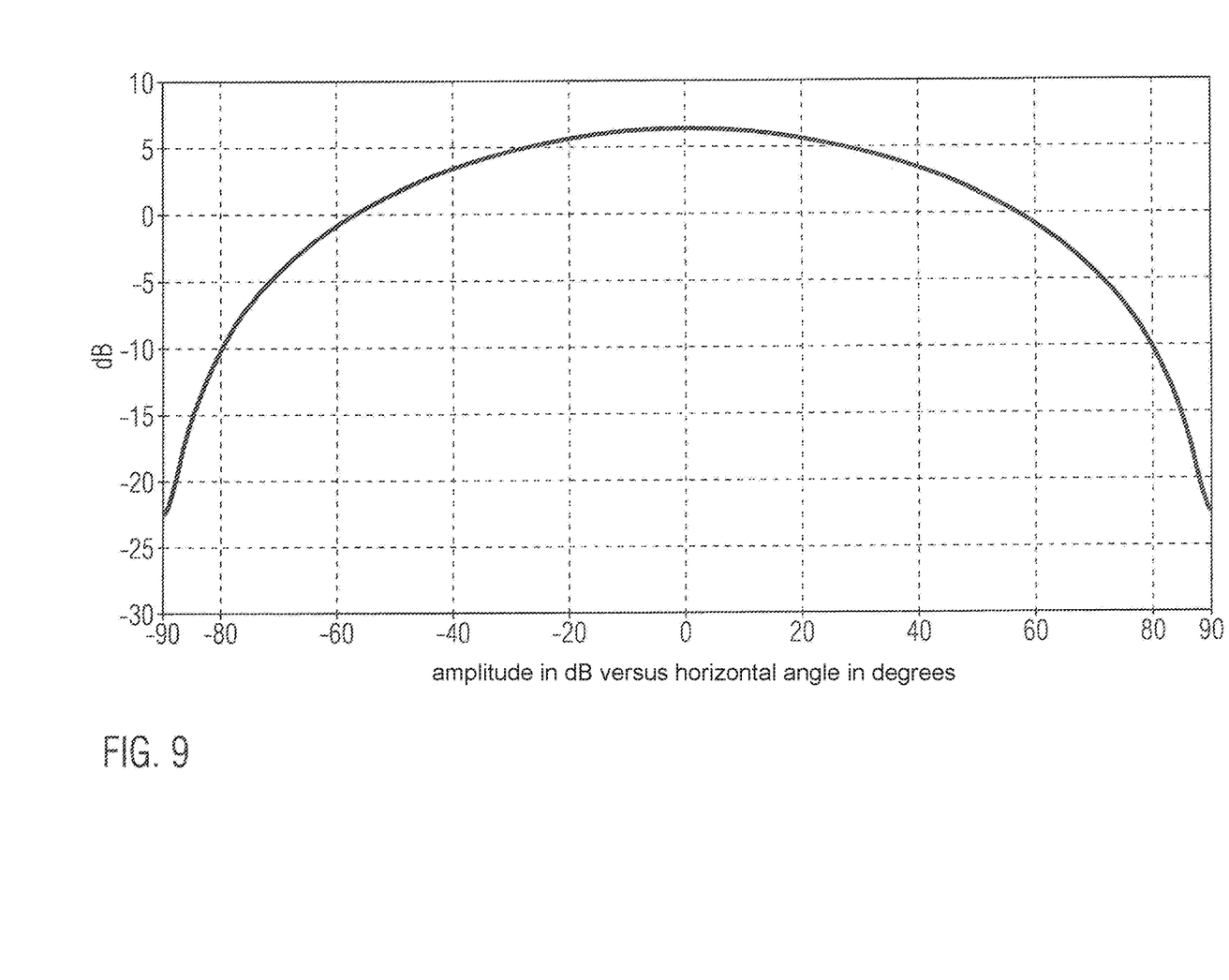
FIG. 9 shows a horizontal diagram of the antenna line.
Figure 10:
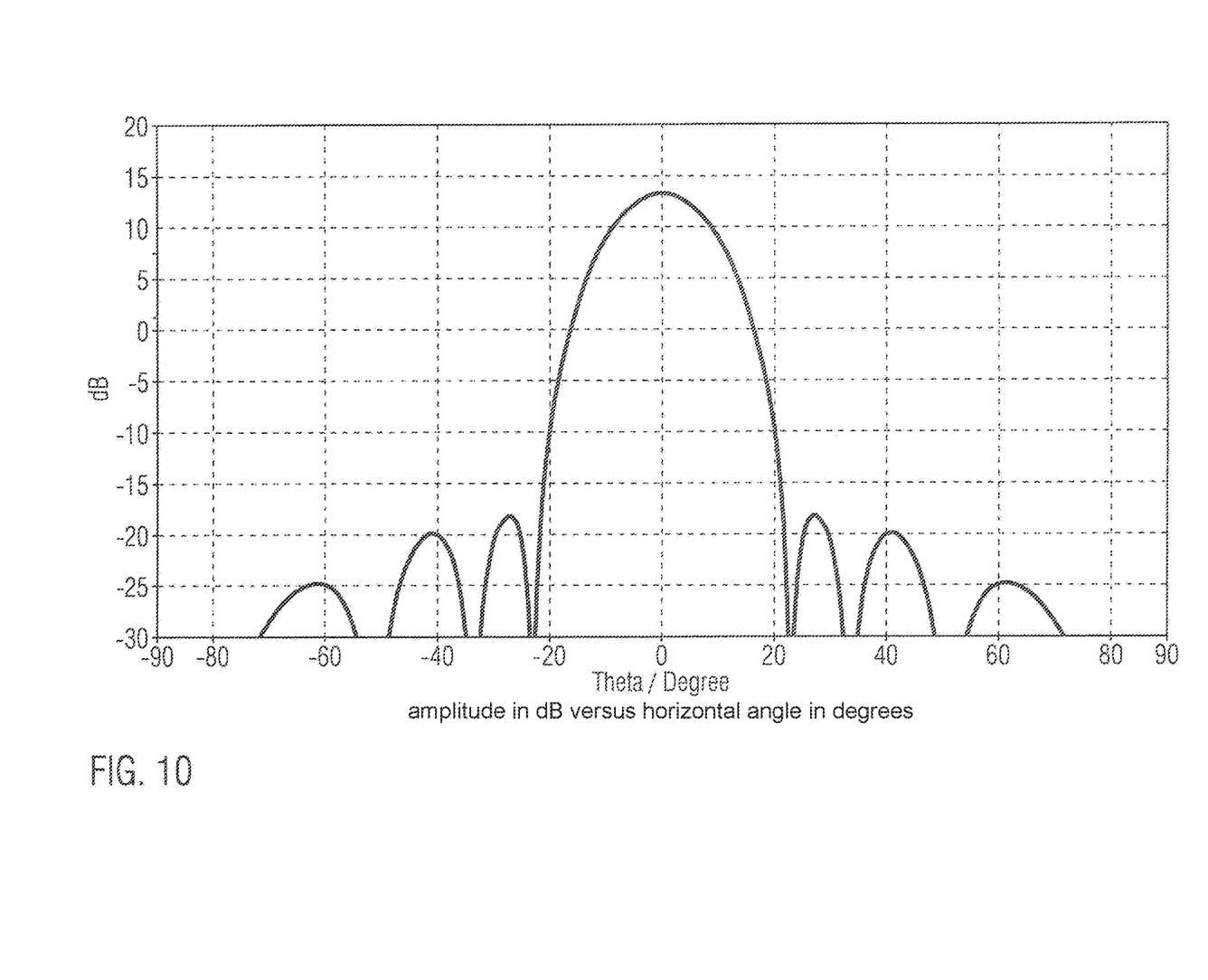
FIG. 10 shows an array.

The horizontal diagram of this antenna line is illustrated in FIG. 9. It has a very large 3 dB beam width in order to illuminate the required wide range of vision of 110°. After the digital beam formation the array diagram shown in FIG. 10 is produced which can be swivelled by up to +50° without so-called grating lobes being produced which could lead to dummy targets.

Figure 11:
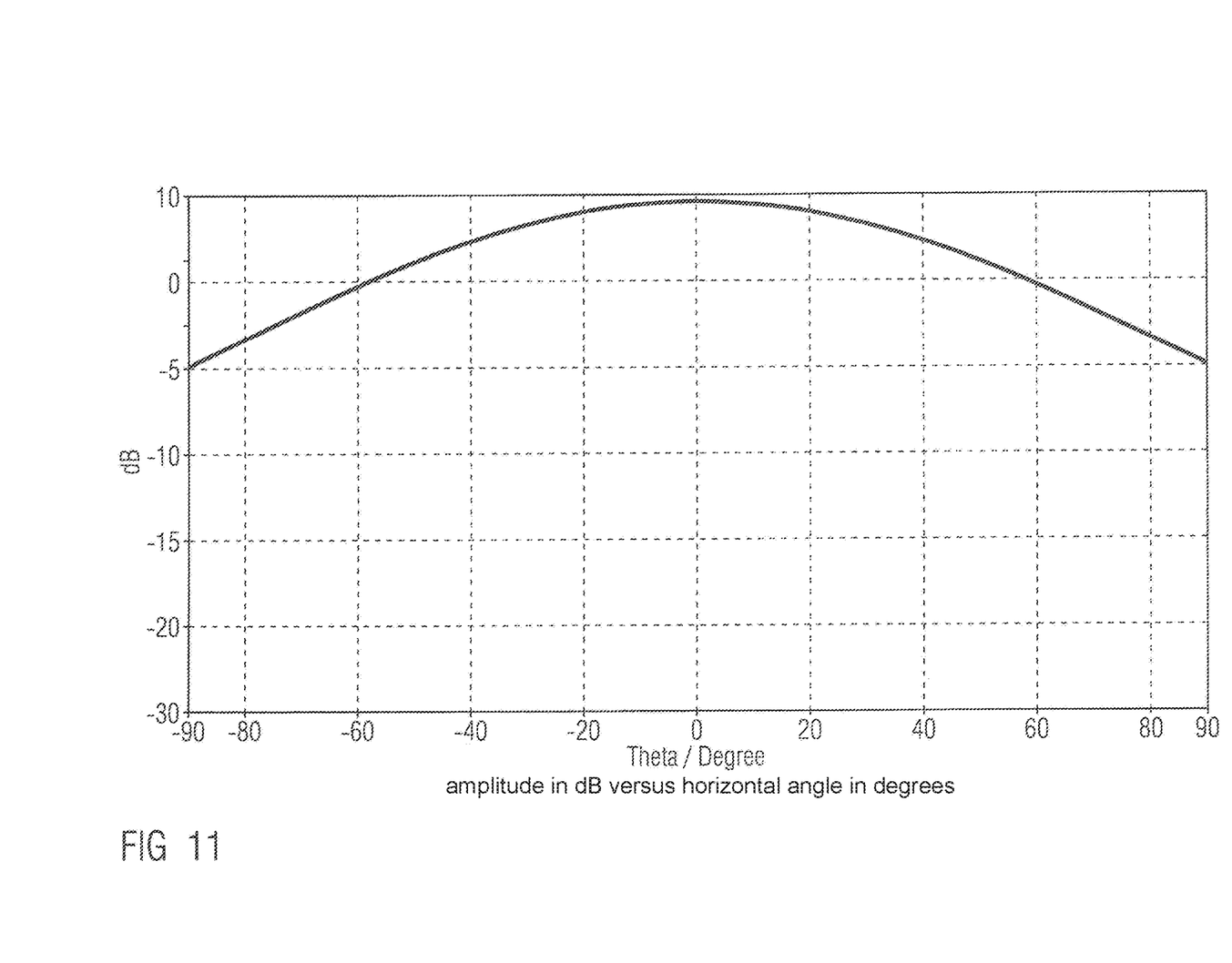
FIG. 11 shows an opening angle of an emitter.

Vertical Scan:

Here, it is not antenna lines, but rather just a single emitter element—a so-called microstrip patch emitter—that is used. This emitter has a large opening angle in both the vertical and the horizontal (see FIG. 11). The digital beam scanning is restricted here to the angle range of −70° to 0°. At −70° dummy targets occur in the opposite direction. However, these would lie physically beneath the surface of the road, and so can be eliminated by a simple plausibility test. Up to a swivel angle of −60° the detection is free from grating lobes, and so from dummy targets.

The door opening range is therefore monitored two-dimensionally by the alternately horizontal and vertical scan, and so protruding obstacles such as loading ramps, handrails or exterior mirrors of adjacent vehicles can also be recognised as obstacles.

Figure 12:
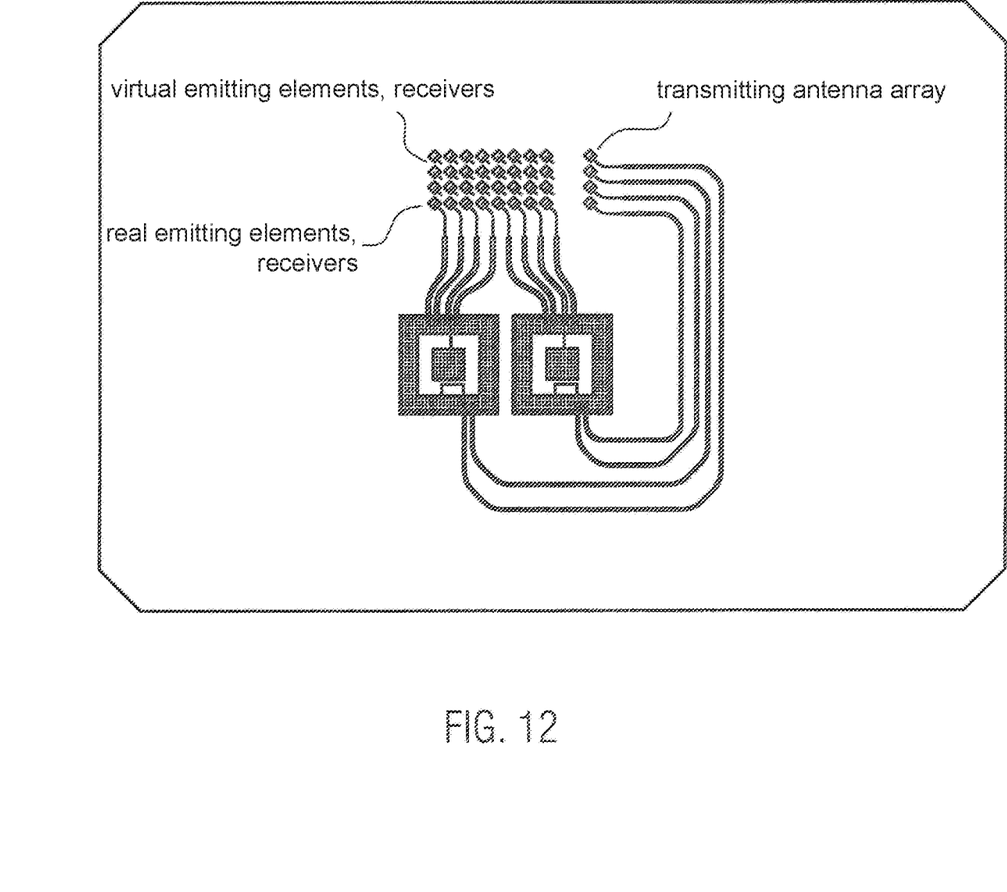
FIG. 12 shows the millimetre wave module with two transmitting/receiving modules.

Two-Dimensional Scan:

An alternative to a radar sensor with horizontal and vertical scan is a radar sensor with a two-dimensional scan with which a high bundling beam can be controlled in two spatial directions. FIG. 12 shows the millimetre wave module with two transmitting/receiving modules which make available 4 transmitters and 8 receivers. Here the transmitting antennas are arranged in a row orthogonal to the row of receiving antennas. The transmitting antennas should have the same polarisation direction here as the receiving antenna in order to guarantee the maximum system sensitivity. When the antennas are fed on the same level, as can be seen for example in FIG. 5, with the necessary spacing of the transmitting/emitting elements a line run feeding the emitting elements would not be possible. In order to implement this the emitter elements have been tilted by 45° on the transmitter as well as on the receiver.

As an extension to the know method described, for example, in /1/, one can therefore generate the virtual reception array that is shown so that an array of 4×8 individual emitters is available for the signal processing. Within the framework of the signal evaluation the phase and the amplitude of each of these individual emitters can be regulated so that beam scanning is possible in the vertical as well as in the horizontal direction.

Figure 13:
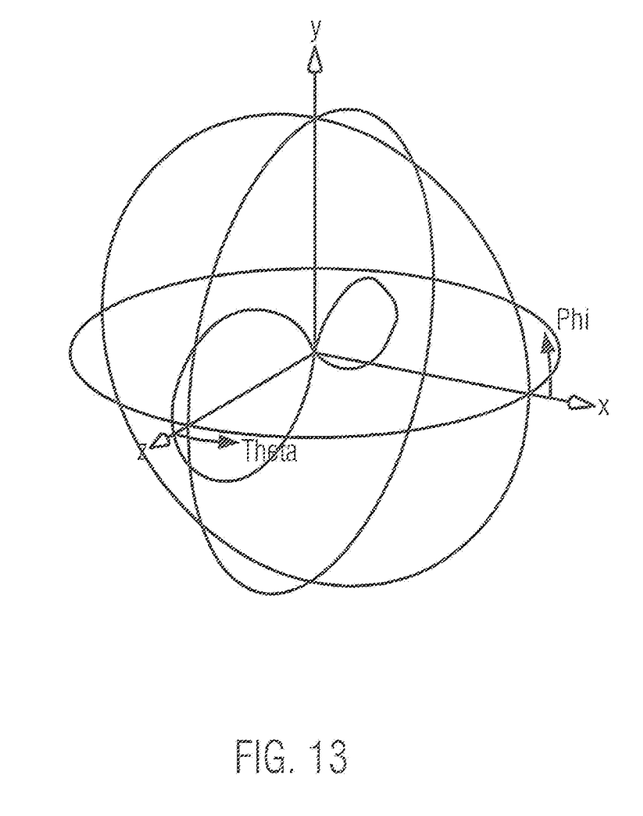
FIG. 13 shows the controllable diagram of the array with a 3 dB beam width of 16 degrees in the horizontal and 29 degrees in the vertical.

FIG. 13 shows the controllable diagram of the array with a 3 dB beam width of 16 degrees in the horizontal and 29 degrees in the vertical.

The invention claimed is:

1. A radar sensor system for a vehicle, comprising:
   at least two radar sensors, each radar sensor comprising:
   a control unit, and
   an antenna array,
   wherein each sensor has a corresponding scanned field of vision,
   wherein the scanned field of vision of the at least two radar sensors overlaps,
   wherein the radar sensor is configured to perform a three-dimensional scan to determine a vertical and horizontal position of an object in order to assist with distinguishing the geometrical nature of the object,
   wherein the radar sensor system is configured to distinguish between punctiform and flat objects,
   wherein the at least two radar sensors are arranged so that they are incapable of detecting a common reflection point of a flat object,
   wherein the radar sensor system is configured, for the flat object, to:
   determine, using a first radar sensor of the at least two radar sensor, a first reflection point on the flat object, a first beam direction extending from the first radar sensor to the first reflection point, and a first line orthogonal to the first beam direction,
   determine, using a second radar sensor of the at least two radar sensor, a second reflection point on the flat object different from the first reflection point, a second beam direction extending from the second radar sensor to the second reflection point, and a second line orthogonal to the second beam direction, and
   determine that at least one of the first line or the second line approximates a surface of the flat object,
   wherein the control unit is programmed to perform the three-dimensional scan with the antenna array according to a digital beam formation in order to form a fan-shaped beam.

2. The radar sensor system of claim 1, wherein the antenna array comprises at least one antenna row of individual antenna transmitters and at least one antenna row of individual antenna receivers.

3. The radar sensor system of claim 2, wherein the at least one antenna row of individual antenna transmitters and the at least one antenna row of individual antenna receivers are arranged orthogonally to one another, and the multi-dimensional scan is a two-dimensional scan.

4. The radar sensor system of claim 3, wherein the control unit is configured to swivel the beam in the vertical as well as in the horizontal direction according to the digital beam formation.

5. The radar sensor system of claim 2, wherein the control unit virtually enlarges the antenna array according to the digital beam formation and forming a virtual array of antenna receivers.

6. The radar sensor system of claim 1, wherein the three-dimensional scan comprises a horizontal scan and a vertical scan, and the control unit comprises a transmitting/receiving device for performing the horizontal scan and a transmitting/receiving device for performing the vertical scan.

7. The radar sensor system of claim 6, wherein the transmitting/receiving device for performing the horizontal scan is associated with at least one antenna row of individual antenna transmitters and with at least one antenna row of individual antenna receivers from the antenna array in order to form the fan-shaped beam.

8. The radar sensor system of claim 6, wherein the transmitting/receiving device for performing the vertical scan is associated with at least one antenna transmitter of the antenna array with a radiating opening angle of at least 29 degrees.

9. The radar sensor system of claim 6, wherein the transmitting/receiving device for performing the horizontal scan and the transmitting/receiving device for performing the vertical scan each comprise a digital beam formation in order to swivel the beam horizontally and/or vertically.

10. The radar sensor system of claim 6, wherein the horizontal scan and the vertical scan are performed sequentially in time.

11. The radar sensor of claim 1, wherein the at least two radar sensors are fitted tilting in relation to a side of the vehicle in order to cover the opening range of the doors of the vehicle.

12. The use of a radar sensor system of claim 1 for monitoring a door space of a vehicle.

13. The use of the radar sensor system of claim 1 to assist with the parking of the vehicle.

14. A method for determining a position of an object using the radar sensor system of claim 1, comprising:

transmitting and receiving signals using antennas with an antenna beam in the form of a fan in a vertical direction;

combining the received signals by digital beam formation to form a number of bundled antenna beams in a horizontal direction;

transmitting and receiving signals with antenna beams in the vertical and the horizontal direction, the antennas being arranged orthogonally to the antennas with the fan-shaped beam, the antenna beams having a width of at least 29 degrees in the vertical direction and at least 16 degrees in the horizontal direction;

combining the received signals from the antenna beams using digital beam formation to form a number of bundled antenna beams in the vertical direction; and displaying a horizontal and a vertical position of the object.

15. A method for determining a position of an object using the radar sensor system of claim 1, comprising:

sequentially transmitting signals with a row of transmitters, and simultaneously receiving the beams reflected on objects with a row of receivers;

combining the received signals using two-dimensional digital beam formation to form a number of bundled antenna beams in a horizontal and a vertical direction; and displaying a horizontal and a vertical position of the object.

* * * * *

UNITED STATES PATENT AND TRADEMARK OFFICE
CERTIFICATE OF CORRECTION

PATENT NO. : 10,877,146 B2  
APPLICATION NO. : 15/532400  
DATED : December 29, 2020  
INVENTOR(S) : Richard Koerber et al.

Page 1 of 1

It is certified that error appears in the above-identified patent and that said Letters Patent is hereby corrected as shown below:

In the Claims

Column 7, Line 20 (Approx.), in Claim 11, after "sensor" insert -- system --.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*